US012609973B2

(12) United States Patent
Lai et al.

(10) Patent No.:  US 12,609,973 B2
(45) Date of Patent:       Apr. 21, 2026

(54) METHOD FOR HANDLING CALLS WITH SESSIONS INITIATION PROTOCOL

(71) Applicant: MEDIATEK INC., Hsin-Chu (TW)

(72) Inventors: Ying-Cen Lai, Hsinchu City (TW); Chien-Yi Wang, Hsinchu City (TW); Nuan-Yu Yang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 268 days.

(21) Appl. No.: 18/503,195

(22) Filed: Nov. 7, 2023

(65) Prior Publication Data

US 2025/0150495 A1      May 8, 2025

(51) Int. Cl.
*H04L 12/66*          (2006.01)
*H04L 65/1016*        (2022.01)
*H04L 65/1069*        (2022.01)
*H04L 65/1104*        (2022.01)

(52) U.S. Cl.
CPC ...... *H04L 65/1104* (2022.05); *H04L 65/1016* (2013.01); *H04L 65/1069* (2013.01)

(58) Field of Classification Search
CPC ............. H04L 65/1069; H04L 65/1104; H04L 65/1016; H04L 1/00; H04L 67/10; H04L 65/403; H04L 65/1063; H04L 65/4015; H04L 65/1083; H04L 65/1089; H04M 7/006; H04M 2201/50
See application file for complete search history.

(56) References Cited

U.S. PATENT DOCUMENTS

| | | | | |
|---|---|---|---|---|
| 9,407,451 | B1 * | 8/2016 | Mistry ............... | H04N 1/00106 |
| 9,942,330 | B2 * | 4/2018 | Mendiratta ......... | H04L 65/1076 |
| 10,630,844 | B1 * | 4/2020 | Ravichandran ..... | H04L 65/1104 |
| 2005/0047389 | A1 * | 3/2005 | Bond ...................... | H04L 63/08 |
| | | | | 370/395.52 |
| 2008/0192732 | A1 * | 8/2008 | Riley ...................... | H04L 12/66 |
| | | | | 370/352 |
| 2011/0296034 | A1 * | 12/2011 | Mayer ............. | H04W 36/00224 |
| | | | | 709/227 |
| 2023/0353565 | A1 * | 11/2023 | Ngo ...................... | H04M 3/436 |
| 2025/0088545 | A1 * | 3/2025 | Shahdad ............. | H04L 65/1016 |

* cited by examiner

*Primary Examiner* — Kharye Pope
(74) *Attorney, Agent, or Firm* — Winston Hsu

(57)                 ABSTRACT

A method for handling a call using Sessions Initiation Protocol (SIP) includes sending an INVITE or a first media type by a network side to user equipment, sending an UPDATE of a second media type by the user equipment to the network side, receiving an SIP global failure response for the UPDATE by the user equipment from the network side, sending an SIP success response for the INVITE of the first media type by the user equipment to the network side, receiving an ACK of the first media type by the user equipment from the network side, and establishing a call session of the first media type between the user equipment and the network side.

20 Claims, 9 Drawing Sheets

Figure 3:
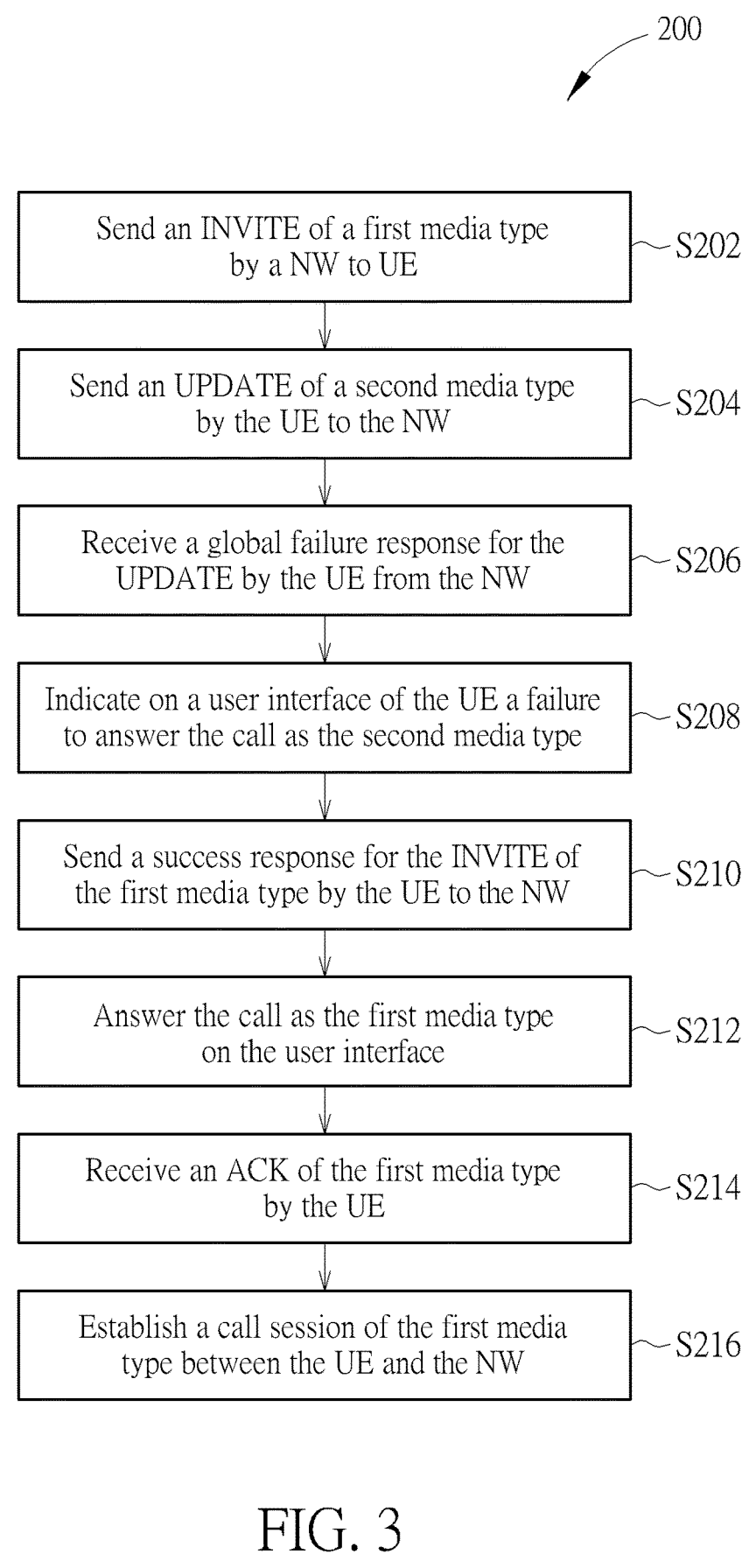

~ 200

| Send an INVITE of a first media type by a NW to UE | ~S202 |

↓

| Send an UPDATE of a second media type by the UE to the NW | ~S204 |

↓

| Receive a global failure response for the UPDATE by the UE from the NW | ~S206 |

↓

| Indicate on a user interface of the UE a failure to answer the call as the second media type | ~S208 |

↓

| Send a success response for the INVITE of the first media type by the UE to the NW | ~S210 |

↓

| Answer the call as the first media type on the user interface | ~S212 |

↓

| Receive an ACK of the first media type by the UE | ~S214 |

↓

| Establish a call session of the first media type between the UE and the NW | ~S216 |

| Send an INVITE of a first media type by a NW to UE | ～S302 |

Send an UPDATE of a second media type by the UE to the NW ～S304

Receive a global failure response for the UPDATE by the UE from the NW ～S306

Send a success response by the UE to the NW ～S308

Receive an ACK of the second media type by the UE from the NW ～S310

Establish a call session of the second media type between the UE and the NW ～S312

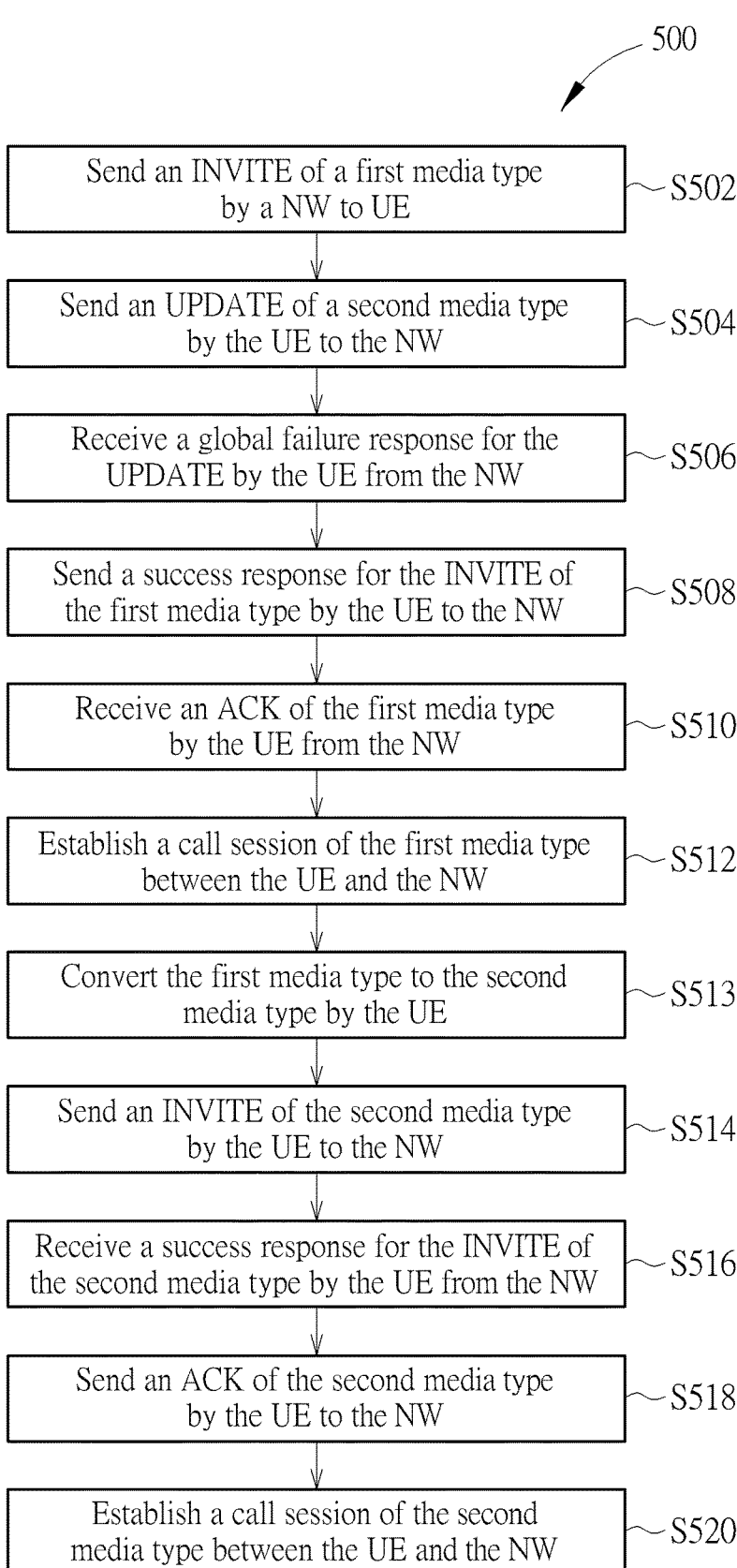

500

Send an INVITE of a first media type
by a NW to UE — S502

Send an UPDATE of a second media type
by the UE to the NW — S504

Receive a global failure response for the
UPDATE by the UE from the NW — S506

Send a success response for the INVITE of
the first media type by the UE to the NW — S508

Receive an ACK of the first media type
by the UE from the NW — S510

Establish a call session of the first media type
between the UE and the NW — S512

Convert the first media type to the second
media type by the UE — S513

Send an INVITE of the second media type
by the UE to the NW — S514

Receive a success response for the INVITE of
the second media type by the UE from the NW — S516

Send an ACK of the second media type
by the UE to the NW — S518

Establish a call session of the second
media type between the UE and the NW — S520

FIG. 9

METHOD FOR HANDLING CALLS WITH SESSIONS INITIATION PROTOCOL

BACKGROUND

Session Initiation Protocol (SIP) is a signaling protocol for initiating, maintaining, and terminating communication sessions that include voice, video and messaging applications. SIP is commonly used in Internet telephony, in private IP telephone systems, as well as mobile phone calling over LTE (VOLTE). In addition, SIP is a text-based protocol, incorporating many elements of the Hypertext Transfer Protocol (HTTP) and the Simple Mail Transfer Protocol (SMTP).

Session Description Protocol (SDP) is a standard for describing multimedia communication sessions for the purposes of announcement and invitation. Its predominant use is in support of streaming media applications, such as voice over IP (VOIP) and video conferencing. SDP does not deliver any media streams itself but is adapted between endpoints for negotiation of network metrics, media types, and other associated properties.

SIP and SDP work together to enable VoIP telephony. SIP is used to establish and control the session, while SDP is used to describe the characteristics of the session. For example, SDP can be used to specify the codecs that will be used for audio and video, as well as the IP addresses and ports that will be used for communication. However at certain conditions, SIP protocol error may occur, causing a communication session between the endpoints to terminate unexpectedly. Thus, it is necessary to develop a method for handling communication to avoid unexpected termination.

SUMMARY

An embodiment provides a method for handling a call using Sessions Initiation Protocol (SIP) including sending an INVITE or a first media type by a network side to user equipment, sending an UPDATE of a second media type by the user equipment to the network side, receiving an SIP global failure response for the UPDATE by the user equipment from the network side, sending an SIP success response for the INVITE of the first media type by the user equipment to the network side, receiving an ACK of the first media type by the user equipment from the network side, and establishing a call session of the first media type between the user equipment and the network side.

Another embodiment provides a method for handling a call using Sessions Initiation Protocol (SIP) including sending an INVITE of a first media type by a network side to user equipment, sending an UPDATE or a second media type by the user equipment to the network side, receiving an SIP global failure response for the UPDATE by the user equipment from the network side, sending a success response for the INVITE of the first media type by the user equipment to the network side, receiving an ACK of the second media type by the user equipment from the network side, and establishing a call session of the second media type between the user equipment and the network side. The success response includes an SDP (Session Description Protocol) body having the second media type.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a flowchart of a method for handling a call with Sessions Initiation Protocol according to the paradigm of FIG. 2.

FIG. 9 is a flowchart of a method for handling a call with Sessions Initiation Protocol according to the paradigm of FIG. 8.

DETAILED DESCRIPTION

Figure 1:
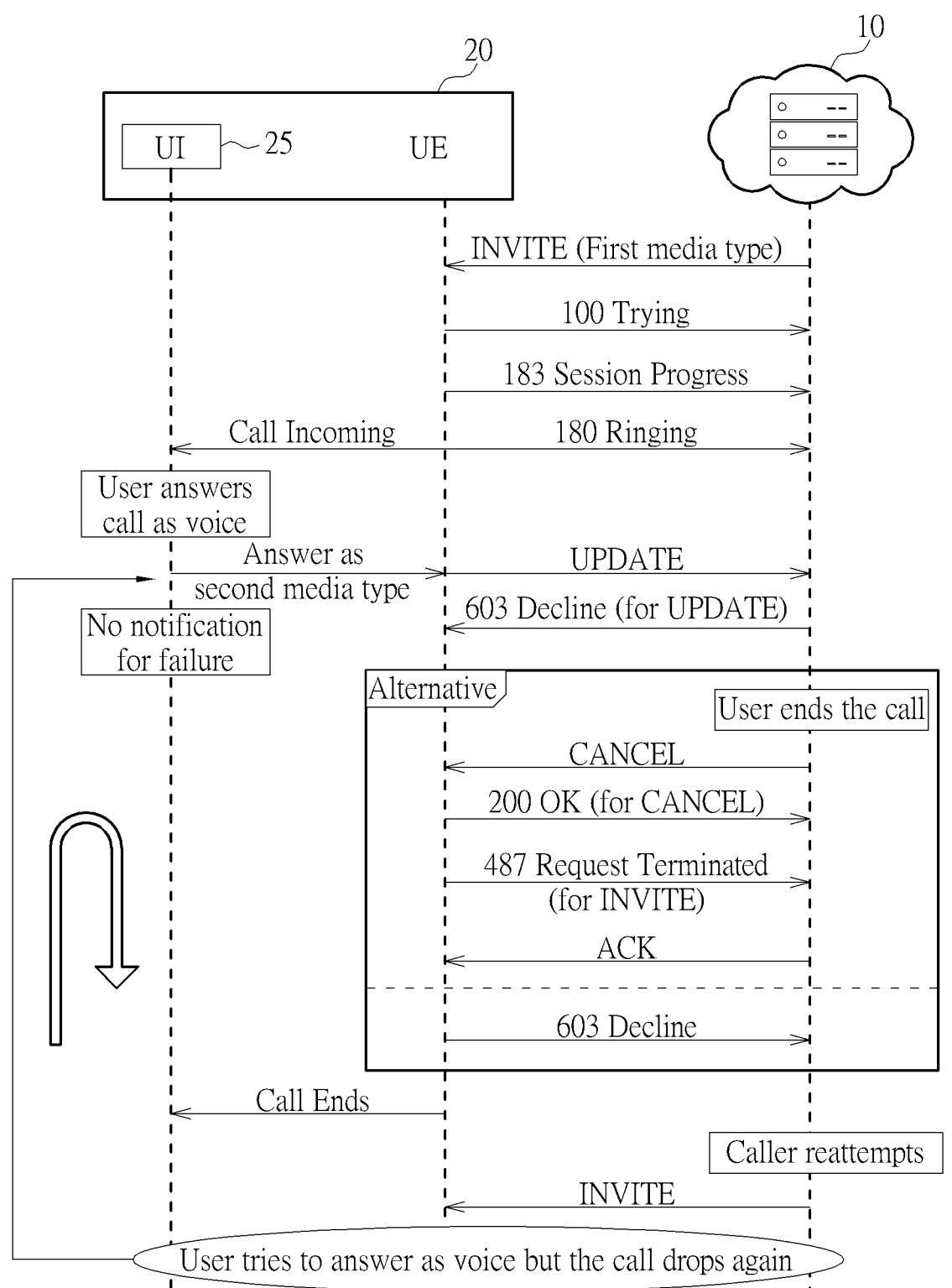
FIG. 1 illustrates an SIP calling paradigm of an embodiment.

The following technique, apparatus and system can be applied to various wireless multiple access systems. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a system, and a Single Frequency Division Multiple Access (SC-FDMA) system. Carrier Frequency Division Multiple Access) systems, and MC-FDMA (Multi-Carrier Frequency Division Multiple Access) systems. CDMA may be implemented through a radio technology such as Universal Terrestrial Radio Access (UTRA) or CDMA2000. TDMA may be implemented through a radio technology such as Global System for Mobile communications (GSM), General Packet Radio Service (GPRS), or Enhanced Data rates for GSM Evolution (EDGE). OFDMA may be implemented through a wireless technology such as Institute of Electrical and Electronics Engineers (IEEE) 802.11 (Wi-Fi), IEEE 802.16 (WiMAX), IEEE 802.20, or Evolved UTRA (E-UTRA). UTRA the is part of Universal Mobile Telecommunications System (UMTS). 3rd Generation Partnership Project (3GPP) Long-Term Evolution (LTE) is a part of Evolved UMTS (E-UMTS) using E-UTRA. 3GPP LTE uses OFDMA in downlink (DL) and SC-FDMA in uplink (UL). Evolution of 3GPP LTE includes LTE-A (Advanced), LTE-A Pro, and/or 5G New Radio (NR).

For purposes of furthering understanding of the disclosure, some explanation will be provided for numerous networking computing devices and protocols.

Session Initiation Protocol (SIP) is a signaling protocol for initiating, maintaining, and terminating communication sessions that include voice, video and messaging applications. SIP is a text-based protocol that uses the User Datagram Protocol (UDP) or Transmission Control Protocol (TCP) for transport. It is a request-response protocol. SIP messages can be broken down into a number of different elements, including the method, the Uniform Resource Identifier (URI), the headers, and the body. SIP uses the method field from HTTP to determine the type of request.

The most common SIP requests are INVITE, ACK, BYE, MESSAGE, UPDATE and CANCEL. INVITE is used to initiate a call session. ACK is used to acknowledge the receipt of an SIP message. BYE is used to terminate a call. MESSAGE is used to send an instant message. UPDATE is used to update parameters of a call session. CANCEL is used to cancel a pending call session. A more detailed description of the SIP requests is as follows:

| SIP Request | Description |
| --- | --- |
| INVITE | Indicates a client is being invited to participate in a call session. |
| ACK | Confirms that the client has received a final response to an INVITE request. |
| CANCEL | Cancels any pending request. |
| OPTIONS | Queries the capabilities of servers. |
| REGISTER | Registers the address listed in the To header field with a SIP server. |
| PRACK | Provisional acknowledgement. |
| SUBSCRIBE | Subscribes for an Event of Notification from the Notifier. |
| NOTIFY | Notify the subscriber of a new Event. |
| PUBLISH | Publishes an event to the Server. |
| INFO | Sends mid-session information that does not modify the session state. |
| REFER | Asks recipient to issue SIP request (call transfer). |
| MESSAGE | Transports instant messages using SIP. |
| UPDATE | Modifies the state of a session without changing the state of the dialog. |

SIP response codes are the codes used by Session Initiation Protocol for communication. They indicate the status of a request or a response. SIP response codes are grouped into six classes, based on the first digit of the code. The response code groups are defined as follows:

| SIP Response | Description |
| --- | --- |
| 100-199 | Information responses |
| 200-299 | Success responses |
| 300-399 | Redirection responses |
| 400-499 | Request failures |
| 500-599 | Server errors |
| 600-699 | Global failures |

Session Description Protocol (SDP) is a standard for describing multimedia communication sessions. It is a text-based protocol that uses the Real Time Transport Protocol (RTP) for transport. SDP is a description of a multimedia communication session, and it describes the codecs to be used for audio and video, as well as the IP addresses and ports for communication. SDP is commonly used in conjunction with SIP to enable VOIP telephony.

SDP bodies describe a session as a group of fields in a text-based format, one field per line. The form of each field is as follows:
<character>=<value>

<character> is a single case-sensitive character and <value> is structured text in a format that depends on the character, which are typically UTF-8 encoded.

Session descriptions have three sections: Session, Timing, and Media. Session contains general information about the session, such as its name, start time, and duration. Timing describes the timing of the session, such as the start time, end time, and interval between media packets. Media describes the media streams that will be used in the session, such as the type of media, the codec, and the transport protocol.

SIP and SDP work together to enable multimedia communication over the Internet. SIP is responsible for establishing, modifying and terminating sessions between different endpoints. SDP is used to describe the media capabilities and preferences of the endpoints. SIP uses SDP as a payload to exchange information about the session parameters, such as the codecs, formats, ports and addresses that will be used for the media streams. SIP and SDP work together to negotiate a common set of media parameters that both endpoints can support and agree on. This way, SIP and SDP enable interoperability and compatibility between different devices and applications that use multimedia communication over the Internet.

For terms and techniques not specifically described, reference may be made to technical documents (e.g., IEEE Standards, RFC Memos) issued before this specification.

FIG. 1 illustrates an SIP calling paradigm of an embodiment. The paradigm shows a network side (NW) 10 (e.g., ISP server) tries to establish a call session with user equipment (UE) 20 (e.g., cellular phone, computer or other mobile devices) using Session Initiation Protocol. In a scenario that a caller at the network side 10 wants to initiate a phone call, the paradigm starts with the network side 10 sending an INVITE of a first media type (e.g., video) to the user equipment 20. The user equipment 20 receives the INVITE of the first media type and responds with 100 Trying, 183 Session Progress and 180 Ringing sequentially to the network side 10. While the user equipment 20 is responding with 180 Ringing to the network side 10, a user interface 25 of the user equipment 20 shows an incoming call of the first media type. A user may have the option to answer the incoming call of the first media type as a call of the second media type (e.g., answering an incoming video call as a voice call), thus selecting the option. Then, the user equipment 20 sends an UPDATE of a second media type (e.g., audio) to the network side 10. The UPDATE may include information of the second media type in its SDP body. In some circumstances, such as a network communication error, the network side 10 may decline the UPDATE by responding with 603 Decline. At this point, the negotiation fails and the call session terminates. There is no notification showing on the user interface 25, thus the user would simply experience a dropped call.

Alternatively, following the 603 Decline, the caller may see that there is no response and may decide to end the call. As the result, the network side 10 sends a CANCEL to the user equipment 20, and a series of SIP responses is exchanged between the network side 10 and the user equipment 20 (as shown in FIG. 1). However, the result is the same. The negotiation fails and the call session terminates. There is no notification showing on the user interface 25, thus the user would simply experience a dropped call.

For further understanding, the following shows an example of some SIP and SDP messages during the negotiation process described above:

SIP/SDP 138 Request: INVITE sip: . . . |
SIP 442 Status: 100 Trying |
SIP/SDP 1018 Status: 183 Session Progress |
SIP 762 Request: PRACK
  sip: [fd00::6:c86a:e23:87a7:61b5]: 40083 |
SIP 650 Status: 200 OK (PRACK) |
SIP/SDP 778 Request: UPDATE
  sip: [fd00::6: c86a: e23:87a7:61b5]: 40083 |
SIP/SDP 706 Status: 200 OK (UPDATE) |
SIP 842 Status: 180 Ringing |
SIP/SDP 442 Request: UPDATE sip: [fd00:0:0:5::20]:
  10197 |
SIP 474 Status: 603 Decline |

The SIP UPDATE request with SDP message body may include the following:

```
v=0
0=-10 11 IN IP6 2600:1001:1012:5f4b:: 2911:260e
s=mtk voice call
C=IN IP6 2600:1001:1012:5f4b:: 2911:260e
b=AS: 38
b=RS: 2500
b=RR: 2500
t=0 0
m=audio 49172 RTP/AVP 115 105
b=AS: 38
b=RS: 2500
b=RR: 2500
a=rtpmap: 115 EVS/16000/1
a=ptime: 20
a=maxptime: 240
a=rtpmap: 105 telephone-event/16000
a=fmtp: 115 max-red=0;br=5.9-13.2; bw=nb-swb; ch-aw-
    recv=3
a=fmtp: 105 0-15
a=sendrecv
a=rtcp-xr: stat-summary=loss, dup, jitt, HL
a=rtcp-xr: voip-metrics
a=rtcp-xr: stat-summary=loss, dup, jitt, HL
a=rtcp-xr: voip-metrics
a=rtcp-xr: stat-summary=loss, dup, jitt, HL
a=rtcp-xr: voip-metrics
m=video 0 RTP/AVPF 114
b=AS: 384
b=RS: 4800
b=RR: 6000
a=rtpmap: 114 H264/90000
a=fmtp: 114 profile-level-id=42C00C;packetization-
    mode=1;                    sprop-parameter-
    sets=ZOLADI2NQeFNNQUCAgeEQinA,
    aMpDyA==
a=rtcp-fb: * nack
a=rtcp-fb: * nack pli
a=rtcp-fb: * nack sli
a=rtcp-fb: * ccm fir
a=rtcp-fb: * trr-int 1000
a=rtcp-fb: * ccm tmmbr
a=extmap: 7 urn: 3gpp: video-orientation
a=sendrecv
a=acfg: 1 t=1
```

Figure 2:
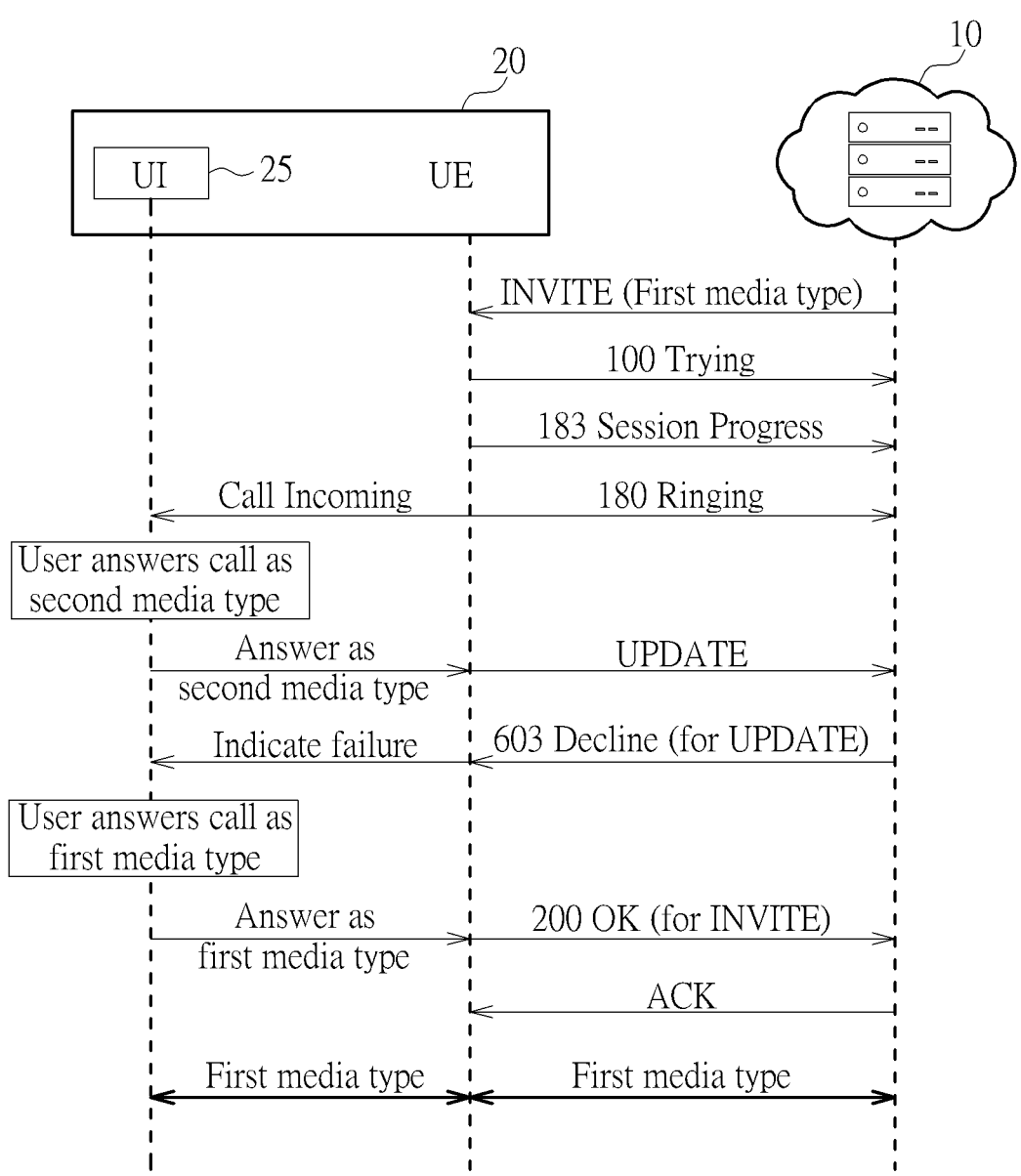
FIG. 2 illustrates an SIP calling paradigm of another embodiment.

FIG. 2 illustrates an SIP calling paradigm of another embodiment. The paradigm describes a procedure that the user equipment (UE) 20 handles 603 Decline from the network side (NW) 10. The paradigm starts with the network side 10 sending an INVITE of the first media type (e.g., video) to the user equipment 20. The user equipment 20 receives the INVITE of the first media type and responds with 100 Trying, 183 Session Progress and 180 Ringing sequentially to the network side 10. While the user equipment 20 responds with 180 Ringing to the network side 10, the user interface 25 shows an incoming call of first media type. A user may have the option to answer the incoming call of the first media type as a call of the second media type (e.g., answering an incoming video call as a voice call), thus selecting the option. Then, the user equipment 20 sends an UPDATE of a second media type (e.g., audio) to the network side 10. The UPDATE may include information of the second media type in its SDP body. In some circumstances, such as a network communication error, the network side 10 may decline the UPDATE by responding with 603 Decline. When the user equipment 20 receives the 603 Decline, it can indicate on the user interface 25 a failure notice to answer the call as the second media type. When the user sees the notice, he can choose to answer the incoming call as the first media type on the user interface 25. If so, the user equipment 20 would send 200 OK to the network side 10. After receiving the 200 OK, the network side 10 would respond with an ACK of the first media type. Thus, a call session (i.e., streaming session) of the first media type can be established between the user equipment 20 and the network side 10.

It should be noted that the first media type and the second media type can include 3GPP defined media types for streaming or calling, for example, video, audio, text and IMS (IP Multimedia Subsystem) data channel, etc.

FIG. 3 is a flowchart of a method 200 for handling a call with Sessions Initiation Protocol according to the paradigm of FIG. 2. The method 200 includes the following steps:

S202: Send an INVITE of a first media type by a network side (NW) 10 to user equipment (UE) 20;

S204: Send an UPDATE of a second media type by the user equipment 20 to the network side 10;

S206: Receive a global failure response for the UPDATE by the user equipment 20 from the network side 10;

S208: Indicate on a user interface 25 of the user equipment 20 a failure to answer the call as the second media type;

S210: Send a success response for the INVITE of the first media type by the user equipment 20 to the network side 10;

S212: Answer the call as the first media type on the user interface 25;

S214: Receive an ACK of the first media type by the user equipment 20 from the network side 10; and S216: Establish a call session of the first media type between the user equipment 20 and the network side 10.

Figure 4:
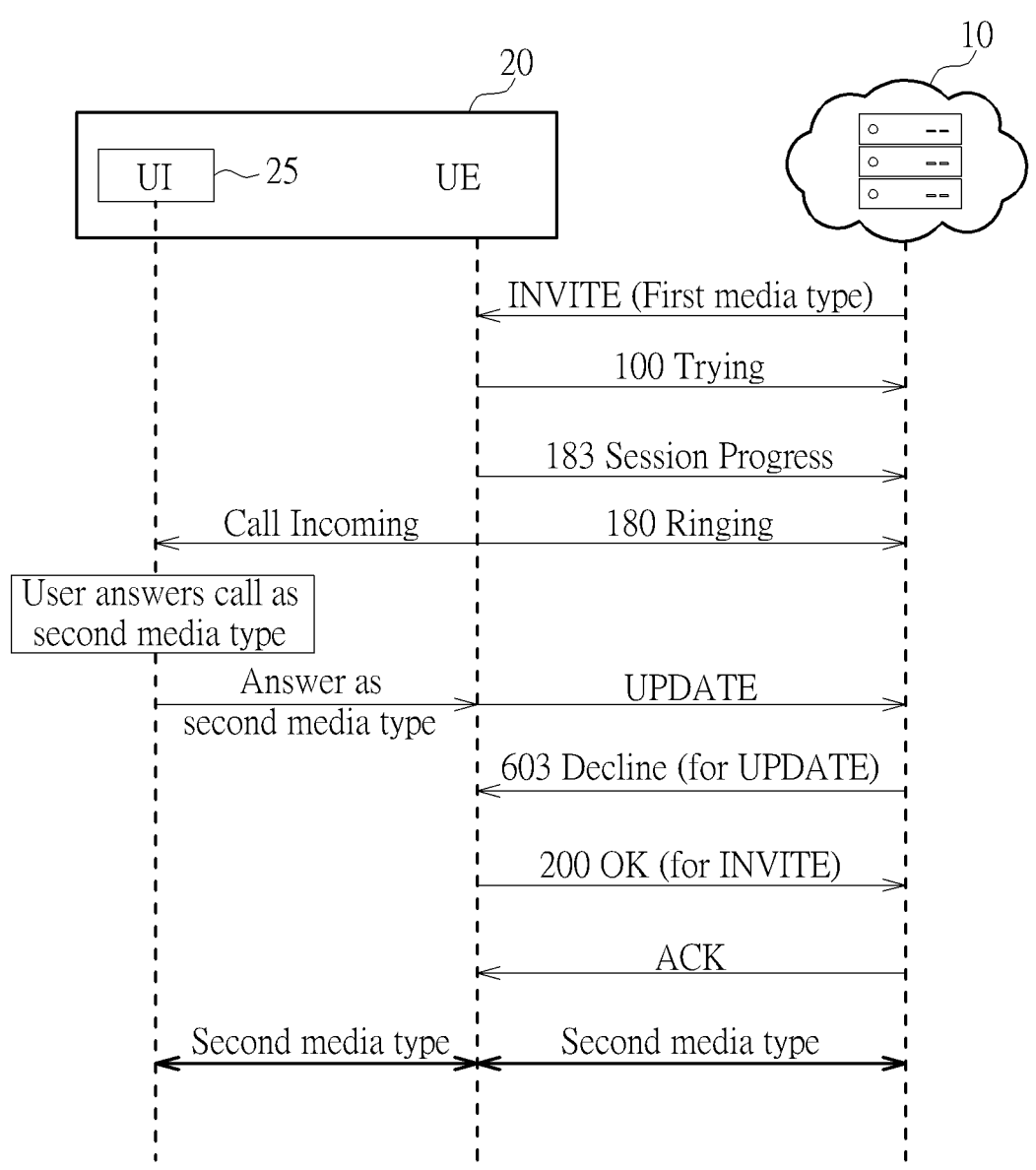
FIG. 4 illustrates an SIP calling paradigm of another embodiment.

FIG. 4 illustrates an SIP calling paradigm of another embodiment. The paradigm describes a procedure that the user equipment (UE) 20 handles 603 Decline from the network side (NW) 10. The paradigm starts with the network side 10 sending an INVITE of the first media type (e.g., video) to the user equipment 20. The user equipment 20 receives the INVITE of the first media type and responds with 100 Trying, 183 Session Progress and 180 Ringing sequentially to the network side 10. While the user equipment 20 responds with 180 Ringing to the network side 10, the user interface 25 shows an incoming call of first media type. A user may have the option to answer the incoming call of the first media type as a call of the second media type (e.g., answering an incoming video call as a voice call), thus selecting the option. Then, the user equipment 20 sends an UPDATE of a second media type (e.g., audio) to the network side 10. The UPDATE may include information of the second media type in its SDP body. In some circumstances, such as a network communication error, the network side 10 may decline the UPDATE by responding with 603 Decline. When the user equipment 20 receives the 603 Decline, it can respond with 200 OK for the INVITE to the network side 10. This 200 OK includes an SDP body having information of the second media type for negotiation. For example, if the second media type is audio, the SDP body may include a field "m=video 0 RTP/AVPF 114." The message is interpreted as disabling video, thus downgrading the video call to a voice call. When the network side receives the 200 OK including the above-mentioned SDP body, it may respond with an ACK of the second media type (e.g., audio) to the user equipment 20. Thus, the negotiation is successful and a call session (i.e., streaming session) of the second media type can be properly established between the user equipment 20 and the network side 10.

Figure 5:
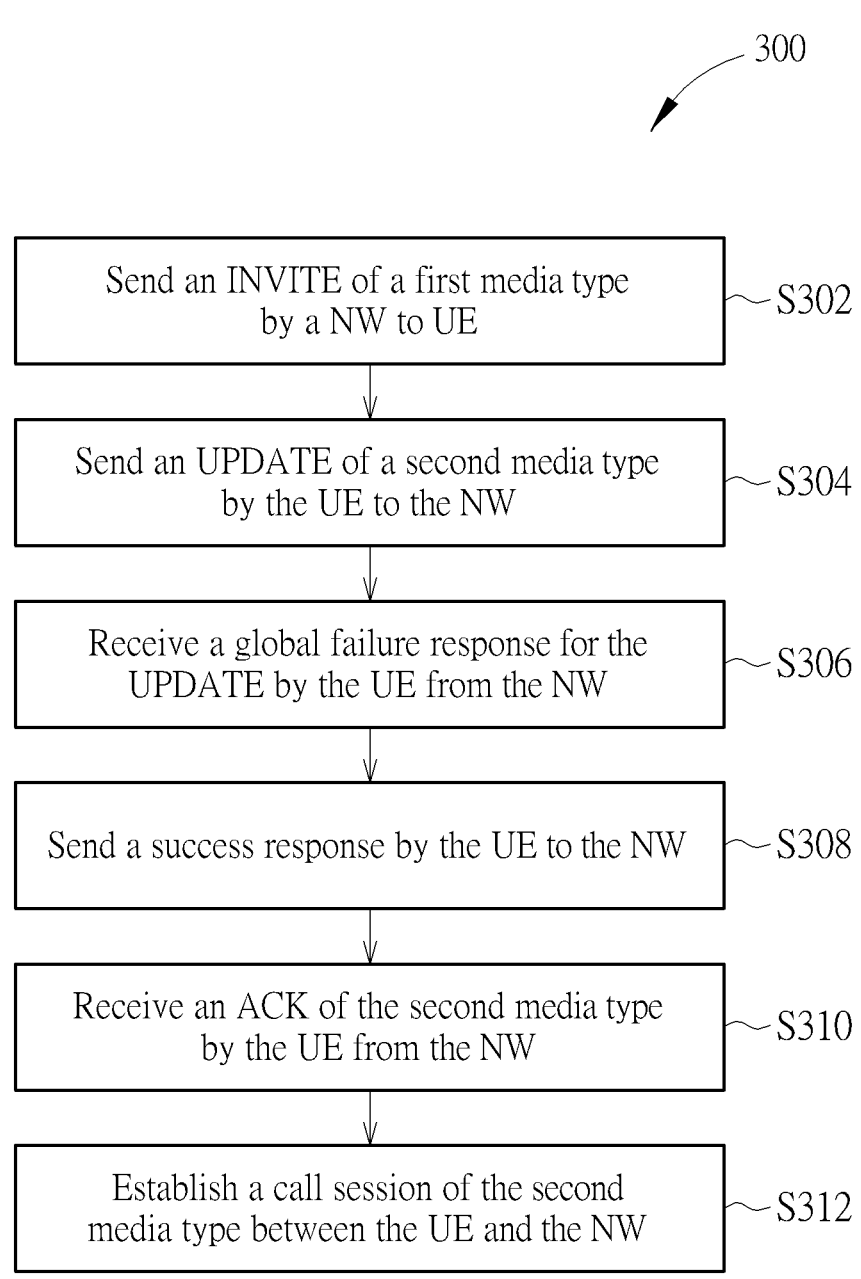
FIG. 5 is a flowchart of a method for handling a call with Sessions Initiation Protocol according to the paradigm of FIG. 4.

FIG. 5 is a flowchart of a method 300 for handling a call with Sessions Initiation Protocol according to the paradigm of FIG. 4. The method 300 includes the following steps:

S302: Send an INVITE of a first media type by a network side 10 to user equipment 20;

S304: Send an UPDATE of a second media type by the user equipment 20 to the network side 10;

S306: Receive a global failure response for the UPDATE by the user equipment 20 from the network side 10;

S308: Send a success response by the user equipment 20 to the network side 10;

S310: Receive an ACK of the second media type by the user equipment 20 from the network side 10; and S312: Establish a call session of the second media type between the user equipment 20 and the network side 10.

It should be noted that the success response in method 300 includes an SDP (Session Description Protocol) body having the second media type. Therefore, this success response may trigger media type update at the network side 10.

Figure 6:
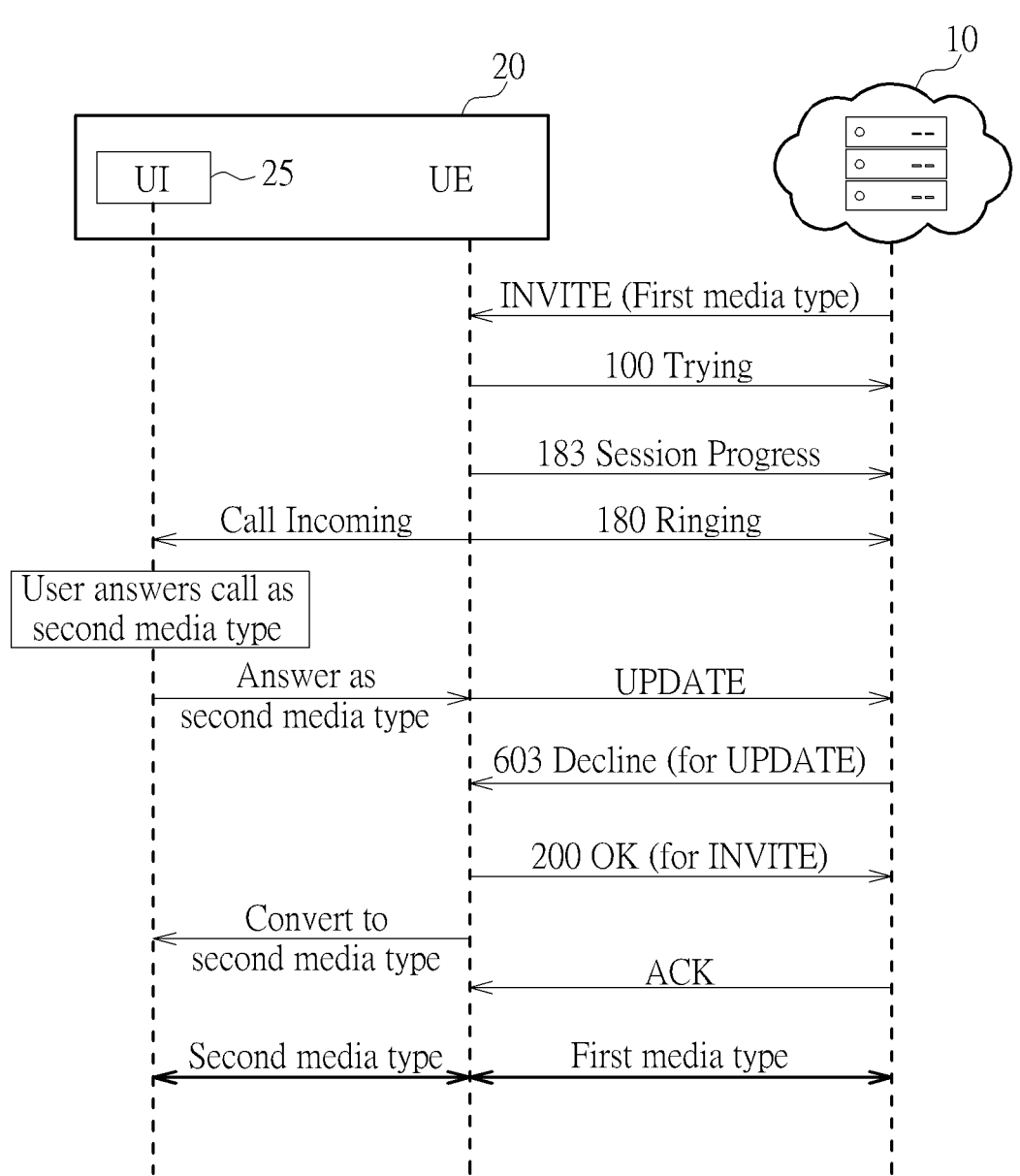
FIG. 6 illustrates an SIP calling paradigm of another embodiment.

FIG. 6 illustrates an SIP calling paradigm of another embodiment. The paradigm describes a procedure that the user equipment (UE) 20 handles 603 Decline from the network side (NW) 10. The paradigm starts with the network side 10 sending an INVITE of the first media type (e.g., video) to the user equipment 20. The user equipment 20 receives the INVITE of the first media type and responds with 100 Trying, 183 Session Progress and 180 Ringing sequentially to the network side 10. While the user equipment 20 responds with 180 Ringing to the network side 10, the user interface 25 shows an incoming call of first media type. A user may have the option to answer the incoming call of the first media type as a call of the second media type (e.g., answering an incoming video call as a voice call), thus selecting the option. Then, the user equipment 20 sends an UPDATE of a second media type (e.g., audio) to the network side 10. The UPDATE may include information of the second media type in its SDP body. In some circumstances, such as a network communication error, the network side 10 may decline the UPDATE by responding with 603 Decline. When the user equipment 20 receives the 603 Decline, it can respond with 200 OK for the INVITE to the network side 10. After receiving the 200 OK, the network side 10 would respond with an ACK of the first media type. Thus, a call session (i.e., streaming session) of the first media type can be established between the user equipment 20 and the network side 10.

While the call session between the user equipment 20 and the network side 10 is in progress, the user equipment 20 may convert the first media type to the second media type and may display the second media type on the user interface 25. In some embodiments, the first media type is video and the second media type is audio. The user equipment 20 can hide video streaming during the call session by displaying a voice call interface on the user interface 25 and sending a static image to the network side 10, so that the remote user on the network side 10 can be aware that the video call is being answered as a voice call.

Furthermore, in some embodiments, the user equipment 20 can hide the video streaming of the call session by turning off a camera of the user equipment 20. The user interface 25 would show a video call interface with the camera off. As the result, the call session for video can be in progress without streaming video from the user equipment 20 to the network side 10.

Figure 7:
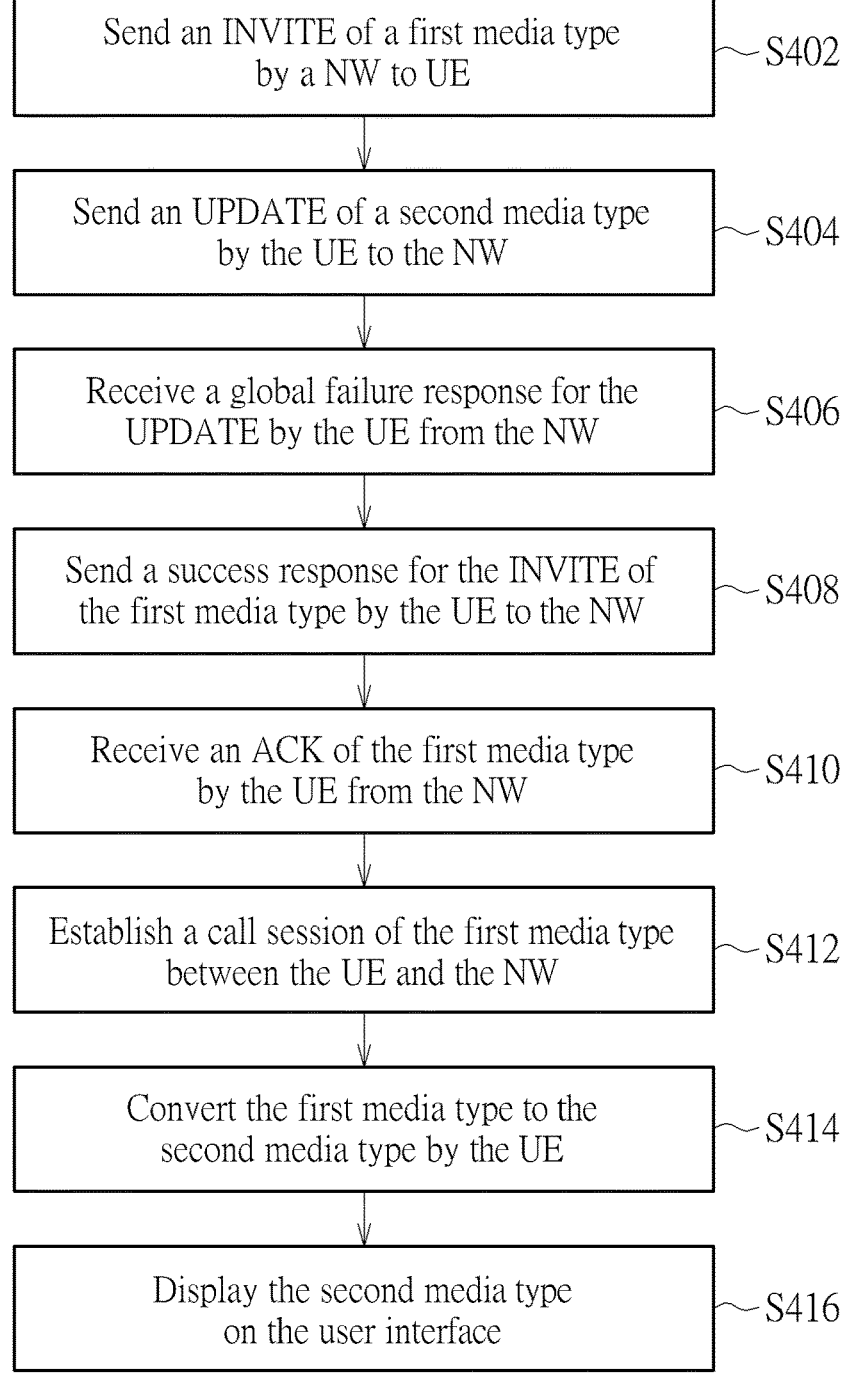
FIG. 7 is a flowchart of a method for handling a call with Sessions Initiation Protocol according to the paradigm of FIG. 6.

FIG. 7 is a flowchart of a method 400 for handling a call with Sessions Initiation Protocol according to the paradigm of FIG. 6. The method 400 includes the following steps:

S402: Send an INVITE of a first media type by a network side 10 to user equipment 20;

S404: Send an UPDATE of a second media type by the user equipment 20 to the network side 10;

S406: Receive a global failure response for the UPDATE by the user equipment 20 from the network side 10;

S408: Send a success response for the INVITE of the first media type by the user equipment 20 to the network side 10;

S410: Receive an ACK of the first media type by the user equipment 20 from the network side 10;

S412: Establish a call session of the first media type between the user equipment 20 and the network side 10.

S414: Convert the first media type to the second media type by the user equipment 20; and S416: Display the second media type on the user interface 25.

The first media type may be video and the second media type may be audio. In some embodiments, the user equipment 20 may hide the video streaming during the call session by sending a static image to the network side 10. In some embodiments, the user equipment 20 may hide the video streaming of the call session by turning off a camera on the user equipment 20.

Figure 8:
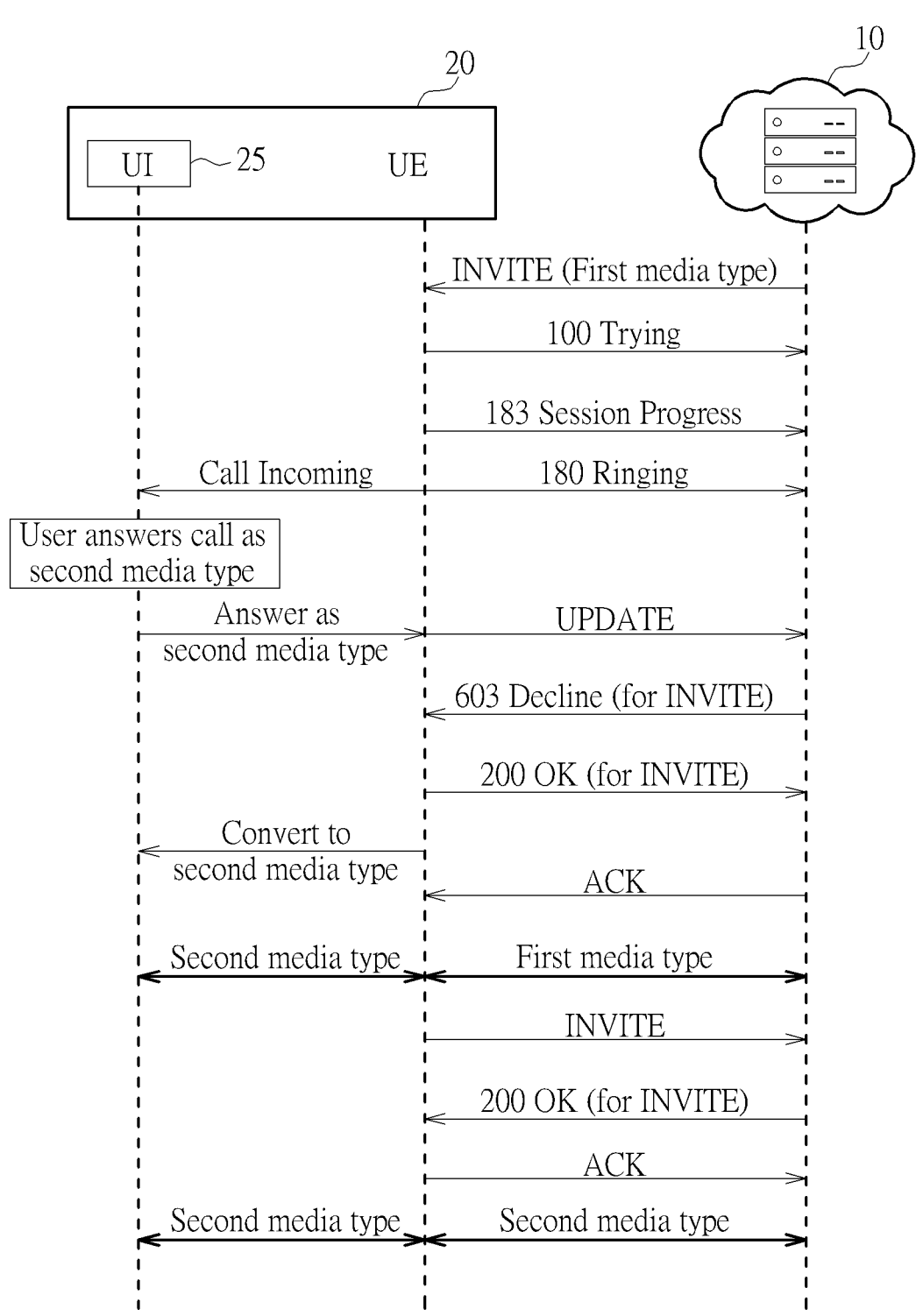
FIG. 8 illustrates an SIP calling paradigm of another embodiment.

FIG. 8 illustrates an SIP calling paradigm of another embodiment. The paradigm describes a procedure that the user equipment (UE) 20 handles 603 Decline from the network side (NW) 10. The paradigm starts with the network side 10 sending an INVITE of the first media type (e.g., video) to the user equipment 20. The user equipment 20 receives the INVITE of the first media type and responds with 100 Trying, 183 Session Progress and 180 Ringing sequentially to the network side 10. While the user equipment 20 responds with 180 Ringing to the network side 10, the user interface 25 shows an incoming call of first media type. A user may have the option to answer the incoming call of the first media type as a call of the second media type (e.g., answering an incoming video call as a voice call), thus selecting the option. Then, the user equipment 20 sends an UPDATE of a second media type (e.g., audio) to the network side 10. The UPDATE may include information of the second media type in its SDP body. In some circumstances, such as a network communication error, the network side 10 may decline the UPDATE by responding with 603 Decline. When the user equipment 20 receives the 603 Decline, it can respond with 200 OK for the INVITE to the network side 10. After receiving the 200 OK, the network side 10 would respond with an ACK of the first media type. Thus, a call session (i.e., streaming session) of the first media type can be established between the user equipment 20 and the network side 10. While the call session between the user equipment 20 and the network side 10 is in progress, the user equipment 20 may convert the first media type to the second media type and may display the second media type on the user interface 25. In some embodiments, the first media type is video and the second media type is audio. The user equipment 20 can hide video streaming during the call session.

Furthermore, while the call session for the first media type is in progress, the user equipment 20 can negotiate a call type transfer by sending an INVITE of the second media type to the network side 10. If successful, the network side 10 would send 200 OK for the INVITE of the second media type. After receiving the 200 OK, the user equipment 20 would send an ACK of the second media type to the network side. As the result, the negotiation is successful and the call session for the second media type can be established between the user equipment 20 and the network side 10.

For example, if the first media type is video and the second media type is audio, the user equipment 20 can negotiate a call downgrade by sending an INVITE of voice (audio) call to the network side 10. If successful, the network side 10 would send 200 OK for the INVITE. After receiving the 200 OK, the user equipment 20 would send an ACK of voice call to the network side 10. Thus, the voice call session can be established between the user equipment 20 and the network side 10.

FIG. 9 is a flowchart of a method 500 for handling a call with Sessions Initiation Protocol according to the paradigm of FIG. 8. The method 500 includes the following steps:

S502: Send an INVITE of a first media type by a network side 10 to user equipment 20;

S504: Send an UPDATE of a second media type by the user equipment 20 to the network side 10;

S506: Receive a global failure response for the UPDATE by the user equipment 20 from the network side 10;

S508: Send a success response for the INVITE of the first media type by the user equipment 20 to the network side 10;

S510: Receive an ACK of the first media type by the user equipment 20 from the network side 10;

S512: Establish a call session of the first media type between the user equipment 20 and the network side 10;

S513: Convert the first media type to the second media type by the user equipment 20;

S514: Send an INVITE of the second media type by the user equipment 20 to the network side 10;

S516: Receive a success response for the INVITE of the second media type by the user equipment 20 from the network side 10;

S518: Send an ACK of the second media type by the user equipment 20 to the network side 10; and S520: Establish a call session of the second media type between the user equipment 20 and the network side 10.

It should be noted that the first media type and the second media type of the various above-mentioned embodiments can include 3GPP defined media types for streaming or calling, for example, video, audio, text and IMS (IP Multimedia Subsystem) data channel, etc. The present invention is not limited thereto. Furthermore, it should be noted that other the call type transfer described by 3GPP, such as video to text, audio to RTT (Real-Time Text), and video to IMS data channel, etc. . . . can also be implemented according to scenarios.

For example, a voice (audio) call can be upgrade to a RTT call according to the following procedure. Firstly, the user equipment 20 can negotiate a call upgrade by sending an INVITE of RTT call to the network side 10. The INVITE may have an SDP body including messages "m=video 0 RTP/AVPF 114" and "m=text 49270 RTP/AVP 112 111". If successful, the network side 10 would send 200 OK for the INVITE. After receiving the 200 OK, the user equipment 20 would send an ACK of the RTT call to the network side 10. Thus, the RTT call session can be established between the user equipment 20 and the network side 10.

The method for handling a call with Sessions Initiation Protocol of various embodiments described above can handle unexpected call interruption caused by initiating and answering the call with different media types, therefore improving user experience.

The UE as described in this disclosure may include a device with radio communication capabilities. For example, the UE may include a smartphone (e.g., handheld touch-screen mobile computing devices connectable to one or more cellular networks). The UE may also include any mobile or non-mobile computing device, such as Personal Data Assistants (PDAs), pagers, laptop computers, desktop computers, wireless handsets, or any computing device that has a wireless communications interface.

The UE may also be referred to as a client, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE may include IoT UE, which can include a network access layer designed for low-power IoT applications utilizing short-lived UE connections. IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UE, which may include uniquely identifiable embedded computing devices (within the Internet infrastructure). The IoT UE may execute background applications (e.g., keep-alive messages, status updates, etc.) to facilitate the connections of the IoT network.

The method for handling a call with Sessions Initiation Protocol described above may be implemented by one or more computers. In further detail, software and hardware hybrid implementations of at least some of the embodiments disclosed may be implemented on a programmable network resident device (which should be understood to include intermittently connected network-aware device) selectively activated or reconfigured by a computer program stored in memory. Such network devices may have multiple network interfaces that may be configured or designed to utilize different types of network communication protocols. A general architecture for some of these devices may be disclosed herein in order to illustrate one or more examples by which a given unit of functionality may be implemented. In some embodiments, at least some of the features or functionalities disclosed herein may be implemented on one or more general-purpose computers associated with one or more networks, such as an end-user computer system, a client computer, a network server or other server system, a mobile computing device (e.g., tablet computing device, mobile phone, smartphone, laptop, and the like), a consumer electronic device or any other suitable electronic device, or any combination thereof. In some embodiments, at least some of the features or functionalities of the various embodiments disclosed may be implemented in one or more virtualized computing environments (e.g., network computing clouds, virtual machines hosted on one or more physical computing machines, or the like).

In some embodiments, the computing instructions may be carried out by an operating system, for example, Microsoft Windows™, Apple Mac OS/X or iOS operating systems, some variety of the Linux operating system, Google Android™ operating system, or the like.

In some embodiments, the computers may be on a distributed computing network, such as one having any number of clients and/or servers. Each client may run software for implementing client-side portions of the embodiments. In addition, any number of servers may be provided for handling requests received from one or more clients. Clients and servers may communicate with one another via one or more electronic networks, which may be in various embodiments such as the Internet, a wide area network, a mobile telephone network, a wireless network (e.g., Wi-Fi, 5G, and so forth), or a local area network. Networks may be implemented using any known network protocols.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for handling a call with Sessions Initiation Protocol (SIP) comprising:
sending an INVITE of a first media type by a network side to user equipment;
sending an UPDATE of a second media type by the user equipment to the network side;
receiving a global failure response for the UPDATE by the user equipment from the network side;
sending a success response for the INVITE of the first media type by the user equipment to the network side;
receiving an ACK of the first media type by the user equipment from the network side; and
establishing a call session of the first media type between the user equipment and the network side.

2. The method of claim 1 further comprising:
indicating on a user interface of the user equipment a failure to answer the call as the second media type; and
answering the call as the first media type on the user interface.

3. The method of claim 1 further comprising:
converting the first media type to the second media type by the user equipment; and
displaying the second media type on the user interface.

4. The method of claim 3, wherein the first media type is video and the second media type is audio, and the user equipment hides video streaming during the call session.

5. The method of claim 4, wherein the user equipment hides the video streaming during the call session by sending a static image to the network side.

6. The method of claim 4, wherein the user equipment hides the video streaming of the call session by turning off a camera of the user equipment.

7. The method of claim 3 further comprising:
sending an INVITE of the second media type by the user equipment to the network side;
receiving a success response for the INVITE of the second media type by the user equipment from the network side;
sending an ACK of the second media type by the user equipment to the network side; and
establishing a call session of the second media type between the user equipment and the network side.

8. The method of claim 1 further comprising sending a plurality of information responses by the user equipment to the network side.

9. The method of claim 8, wherein the plurality of information responses comprise 100 Trying, 180 Ringing and 183 Session Progress.

10. The method of claim 1, wherein the first media type and the second media type comprise 3GPP defined media types for the call session.

11. The method of claim 10, wherein the first media type comprises one of video, audio, real-time text, and IMS data channel, and the second media type comprises one of video, audio, real-time text, and IMS data channel.

12. The method of claim 1, wherein the success response is 200 OK.

13. The method of claim 1, wherein the global failure response is 603 Decline.

14. A method for handling a call with Sessions Initiation Protocol (SIP) comprising:
sending an INVITE of a first media type by a network side to user equipment;

sending an UPDATE of a second media type by the user equipment to the network side;

receiving a global failure response for the UPDATE by the user equipment from the network side;

sending a success response for the INVITE of the first media type by the user equipment to the network side, the success response comprising an SDP (Session Description Protocol) body having the second media type;

receiving an ACK of the second media type by the user equipment from the network side; and establishing a call session of the second media type between the user equipment and the network side.

15. The method of claim 14, wherein the first media type and the second media type comprise 3GPP defined media types for calling.

16. The method of claim 15, wherein the first media type comprises one of video, audio, real-time text, and IMS data channel, and the second media type comprises one of video, audio, real-time text, and IMS data channel.

17. The method of claim 14, wherein the success response is 200 OK.

18. The method of claim 14, wherein the global failure response is the SIP error message which represents SDP update failure.

19. The method of claim 14 further comprising sending a plurality of information responses by the user equipment to the network side.

20. The method of claim 19, wherein the plurality of information responses comprise 100 Trying, 180 Ringing and 183 Session Progress.

* * * * *